US012680465B2

(12) United States Patent
Baladi et al.

(10) Patent No.: US 12,680,465 B2
(45) Date of Patent: Jul. 14, 2026

(54) ELECTRIC MACHINE ASSEMBLY FOR A TURBINE ENGINE

(71) Applicants: GE Avio S.r.l., Rivalta di Torino (IT); GENERAL ELECTRIC COMPANY, Schenectady, NY (US)

(72) Inventors: Mehdi Milani Baladi, Cincinnati, OH (US); Paul Robert Gemin, Cincinnati, OH (US)

(73) Assignees: GE Avio S.r.l., Rivalta di Torino (IT); General Electric Company, Evendale, OH (US)

(*) Notice: Subject to any disclaimer, the term of this patent is extended or adjusted under 35 U.S.C. 154(b) by 70 days.

(21) Appl. No.: 18/740,010

(22) Filed: Jun. 11, 2024

(65) Prior Publication Data

US 2024/0328328 A1 Oct. 3, 2024

Related U.S. Application Data

(62) Division of application No. 17/498,090, filed on Oct. 11, 2021, now Pat. No. 12,037,913.

(30) Foreign Application Priority Data

Nov. 2, 2020 (IT) ........................ 102020000026074

(51) Int. Cl.
*F01D 15/12* (2006.01)

(52) U.S. Cl.
CPC .......... *F01D 15/12* (2013.01); *F05D 2220/32* (2013.01); *F05D 2220/76* (2013.01); *F05D 2260/4023* (2013.01)

(58) Field of Classification Search
CPC .. F02C 7/26; F02C 7/262; F02C 7/268; F02C 7/275; F02C 7/32; F02C 7/36; F02C 3/107; F02C 3/113; F01D 15/10; F01D 15/12; F05D 2220/32; F05D 2220/76; F05D 2260/4023; F05D 2260/85
See application file for complete search history.

(56) References Cited

U.S. PATENT DOCUMENTS

| | | | |
|---|---|---|---|
| 3,262,526 | A | 7/1966 | Kramer |
| 5,070,978 | A | 12/1991 | Pires |
| 6,622,837 | B2 | 9/2003 | Ochab et al. |
| 7,353,895 | B2 | 4/2008 | Bitsche et al. |
| 7,975,490 | B2 | 7/2011 | Yu |
| 7,997,085 | B2 | 8/2011 | Moniz et al. |

(Continued)

FOREIGN PATENT DOCUMENTS

| | | | |
|---|---|---|---|
| CN | 111699311 | A | 9/2020 |
| EP | 3354881 | A1 | 1/2018 |

(Continued)

*Primary Examiner* — David P. Olynick
(74) *Attorney, Agent, or Firm* — Dority & Manning, P.A.

(57) ABSTRACT

A turbine engine with a turbine core that includes a compressor section having a compressor, a combustion section, a turbine section having a high pressure turbine and a low pressure turbine, and a nozzle section. A high speed shaft couples the high pressure turbine to the compressor. A first gearbox selectively coupling an output of an electric machine and the high speed shaft. A second gearbox couples an input/output of the electric machine and a low speed shaft, where the low speed shaft is coupled to the low pressure turbine.

20 Claims, 4 Drawing Sheets

(56) References Cited

U.S. PATENT DOCUMENTS

| | | | |
|---|---|---|---|
| 8,015,828 | B2 | 9/2011 | Moniz et al. |
| 8,314,505 | B2 | 11/2012 | McLoughlin et al. |
| 8,350,398 | B2 | 1/2013 | Butt |
| 8,461,704 | B2 | 6/2013 | McLoughlin et al. |
| 8,500,583 | B2 | 8/2013 | Goi et al. |
| 8,745,990 | B2 | 6/2014 | Burkholder et al. |
| 8,776,935 | B1 | 7/2014 | Morgan et al. |
| 9,735,650 | B2 | 8/2017 | Menheere et al. |
| 10,422,243 | B2 | 9/2019 | Suciu et al. |
| 10,458,338 | B2 | 10/2019 | Szczepanowski et al. |
| 2006/0272313 | A1 | 12/2006 | Eick et al. |
| 2007/0151258 | A1 | 7/2007 | Gaines et al. |
| 2007/0277532 | A1 | 12/2007 | Talan |
| 2008/0006023 | A1 | 1/2008 | Lardellier |
| 2010/0133832 | A1 | 6/2010 | Butt |
| 2010/0283341 | A1 | 11/2010 | Grosskopf et al. |
| 2011/0101693 | A1 | 5/2011 | Gio et al. |
| 2015/0308350 | A1* | 10/2015 | Dobosz .................. F16H 1/222 74/15.63 |
| 2015/0377142 | A1 | 12/2015 | Sheridan |
| 2018/0202310 | A1 | 7/2018 | Suciu et al. |
| 2018/0202368 | A1 | 7/2018 | Suciu et al. |
| 2018/0223740 | A1 | 8/2018 | Forest et al. |
| 2019/0085715 | A1 | 3/2019 | van der Merwe et al. |
| 2020/0284201 | A1 | 9/2020 | Gebhard et al. |
| 2020/0386188 | A1 | 12/2020 | Kupratis et al. |
| 2021/0010384 | A1 | 1/2021 | Bradley |
| 2021/0079850 | A1 | 3/2021 | Davies |

FOREIGN PATENT DOCUMENTS

| | | | |
|---|---|---|---|
| EP | 3514335 | A1 | 7/2019 |
| FR | 2921423 | B1 | 3/2009 |

* cited by examiner

ELECTRIC MACHINE ASSEMBLY FOR A TURBINE ENGINE

CROSS-REFERENCE TO RELATED APPLICATION(S)

This application is a divisional application of U.S. patent application Ser. No. 17/498,090, filed Oct. 11, 2021, now allowed, which claims priority to Italian Application No. 102020000026074, filed Nov. 2, 2020, all of which are incorporated herein by reference their entirety.

TECHNICAL FIELD

This disclosure relates generally to turbine engines, and more specifically to an electric machine assembly configured to start the turbine engine and also configured to generate electrical power.

BACKGROUND

At least some known turbine engines include a core engine having, in serial flow arrangement, a compressor which compresses airflow entering the engine, a combustor which burns a mixture of fuel and air, and low and high pressure turbines which extract energy from airflow discharged from the combustor.

In order to start the turbine engine, it is necessary to rotate the rotor shaft to provide compressed air to the combustor. But, the turbine section is unable to rotate this shaft during starting because the combustor is not yet producing exhaust gases. In this respect, a starter (e.g., an electric motor, hydraulic motor, pneumatic motor, etc.) must rotate the rotor shaft until the combustor produces exhaust gases.

BRIEF DESCRIPTION

Aspects and advantages of the disclosure will be set forth in part in the following description, or may be obvious from the description, or may be learned through practice of the disclosure herein.

In one aspect, the disclosure relates to a gas turbine engine, comprising a turbine core, comprising a compressor section having a compressor coupled to a high speed shaft, a combustion section, a turbine section having a high pressure turbine coupled to the high speed shaft and a low pressure turbine coupled to a low speed shaft, and a nozzle section, an electric machine coupled to the low speed shaft, and a first clutch assembly selectively operably coupling the electric machine to the high speed shaft, wherein, upon coupling, the electrical machine provides an output to the high speed shaft.

In another aspect, the disclosure relates to an electrical power system for an aircraft having at least one turbine engine with a high speed shaft and a low speed shaft, the electrical power system, comprising an electrical machine connected via a permanent coupling mechanism to the low speed shaft and driven by the low speed shaft, the electrical machine selectively operably coupled to the high speed shaft via a first clutch assembly.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which refers to the appended figures in which.

In the drawings.

DETAILED DESCRIPTION

Figure 1:
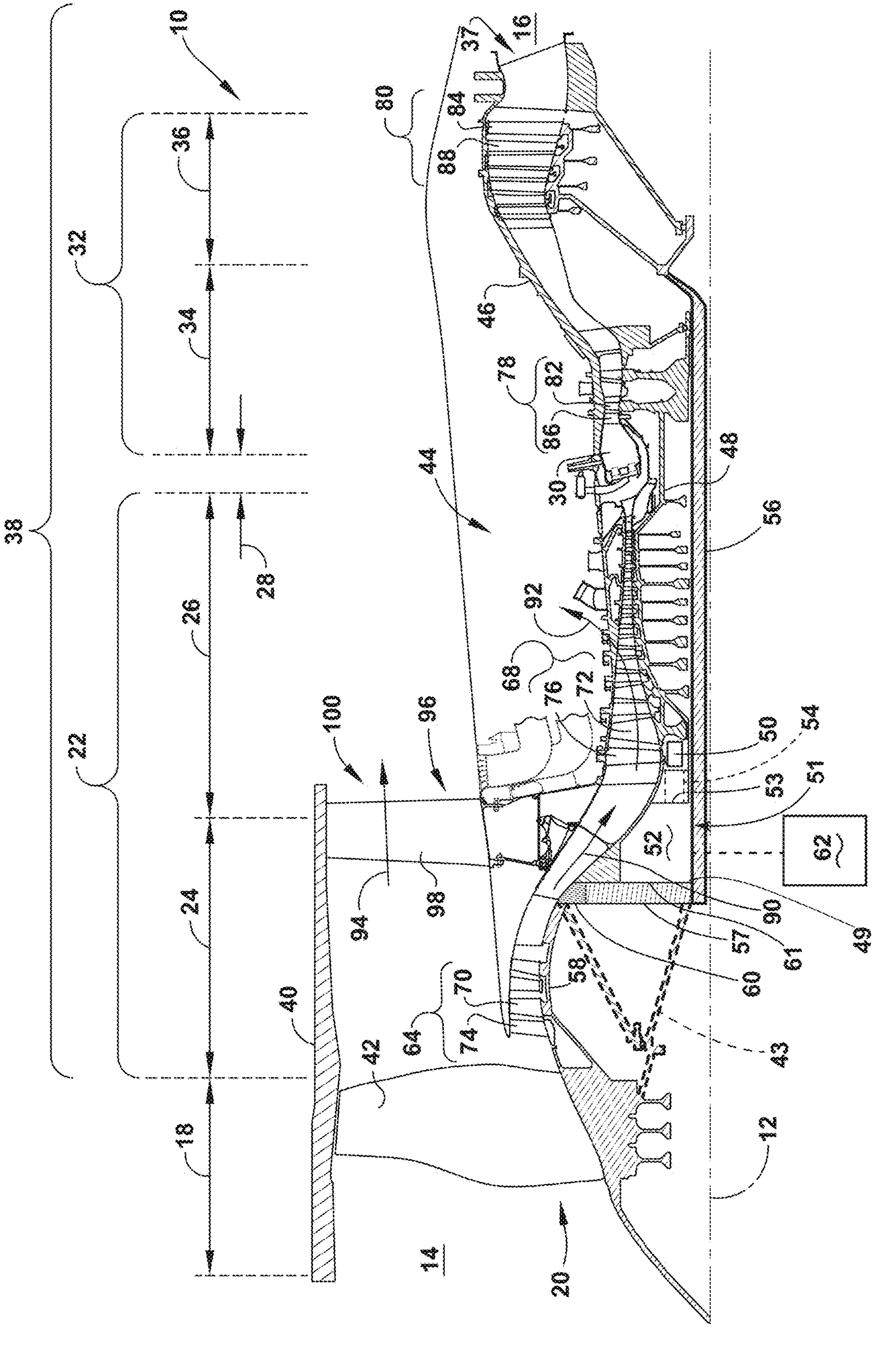
FIG. 1 is a schematic cross-section view of a turbine engine that includes an electric machine assembly, according to aspects of the present disclosure.

Typically, the starter indirectly couples to the rotor shaft in conventional gas turbine stating systems. More specifically, the starter rotates an axial shaft, which couples to a transfer gearbox (TGB). The TGB transfers the rotation of the axial shaft to a radial shaft. However, the TGB, radial shaft, and axial shaft are expensive and time consuming to manufacture and assemble. Furthermore, these components increase the overall complexity, weight, and can even alter the aerodynamics or weight distribution of a vehicle to which the turbine engine is mounted.

Generators are often coupled to an accessory gearbox (AGB) that is mounted on an outer casing of the turbine engine. The generator and AGB provide accessory power; which is in high demand. Similar to the TGB, the external mounting of the generator or the AGB increases the overall complexity and weight of the turbine engine. Further, it can even alter the aerodynamics or weight distribution of a vehicle to which the turbine engine is mounted.

Aspects described herein provide an electric machine assembly for a turbine engine. The electric machine assembly includes an electric machine that operates in two modes; a starting mode and a generating mode. The electric machine selectively couples to a high speed shaft to provide rotation for starting the turbine engine. Once in the generating mode, the electric machine decouples from the high speed shaft. The electric machine is permanently attached to a low speed shaft that can provide a rotational input to the engine machine. The electric machine, with input from the low speed shaft, can generate electrical energy that can be provided to the accessories and systems of the aircraft, vehicle, or other aspects of the turbine engine. This eliminates the need for additional accessory gearboxes or transfer gearboxes, which can distort the aerodynamics, add weight, or add needless complexity to the turbine engine.

Having the low speed shaft permanently attached to the electrical machine can improve stability of the turbine engine. The term “permanently” as utilized herein can includes a direct coupling or an indirect coupling such as through a gear train or bevel box, by way of non-limiting examples. The term “permanently” indicates that connection is constant and is in contrast to the term "selectively." The term "selectively" indicates that the connection is variable and can change from being coupled to uncoupled or vice versa such as via a clutch or other passive or active means to connect and disconnect the shafts. Further, in the event that the turbine engine is quickly shut down, the permanent connection between the electric engine allows the low speed shaft to continue to rotate. This promotes air flowing out of the turbine engine and can reduce the thermal effects on the engine due to rapid shut-down of the turbine engine.

For purposes of illustration, the present disclosure will be described with respect to a turbine engine for an aircraft. The disclosure can have applicability in a variety of vehicles or engines, and can be used to provide benefits in industrial, commercial, and residential applications. Further non-limiting examples of other vehicles or engines to which the disclosure can relate can include boats, helicopters, cars, or other aquatic, air, space, or land vehicles. Industrial, commercial, or residential applications of the disclosure can include, but are not limited to, marine power plants, wind turbines, hybrid electric machines, or small power plants.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an example, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic view of a gas turbine engine 10 for an aircraft. The turbine engine 10 has a centerline or turbine engine axis of rotation 12 extending forward 14 to aft 16. The turbine engine 10 includes, in downstream serial flow relationship, a fan section 18 including a fan assembly 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and a nozzle section 37. A turbine core 38 can be defined by the compressor section 22, the combustion section 28, the turbine section 32, and the nozzle section 37.

The fan section 18 includes a fan casing 40 surrounding the fan assembly 20. The fan assembly 20 includes a plurality of fan blades 42 disposed radially about the turbine engine axis of rotation 12. The HP compressor 26, the combustor 30, and the HP turbine 34 form an engine core 44, which generates combustion gases. The turbine core 38, which includes the engine core 44, can be surrounded by core housing 46, which can be coupled with the fan casing 40. Fan supports 43 can include, by way of non-limiting example, one or more of rotatable or non-rotatable stabilizers, bearings, sensors, or connecting shafts.

The HP spool, HP shaft, or high speed shaft 48 is disposed coaxially about the turbine engine axis of rotation 12 of the turbine engine 10 and drivingly connects the HP turbine 34 to the HP compressor 26. The high speed shaft 48 can be considered part of the turbine engine 10.

The LP turbine spool, LP turbine shaft, or low speed shaft 56 permanently connects the LP turbine 36 to an electric machine assembly 51 and can selectively couple the LP turbine 36 and the LP compressor 24. While the low speed shaft 56 permanently provides a rotational input/output to the electric machine assembly 51 it can be considered part of the turbine engine 10.

In the illustrated example, the electric machine assembly 51 includes an electric machine 52 having an input/output 49 permanently coupled to the low speed shaft 56 and an output 53 selectively coupled to the high speed shaft 48 via a first clutch assembly 50. Optionally, the electric machine assembly 51 can further include a first gearbox 54 and a second gearbox 57. The first gearbox 54 can couple the output 53 of the electric machine 52 to the first clutch assembly 50, where the first clutch assembly 50 selectively engages the high speed shaft 48. One or more portions of the second gearbox 57 can be part of the permanent connection between the input/output 49 of the electric machine 52 and the low speed shaft 56.

The electric machine 52 is shown, by way of example, as axially aft or downstream of the LP compressor 24 and forward or upstream of the HP compressor 26. That is, the electric machine 52, as illustrated in FIG. 1 is on a cold end of the engine 10. As used herein, the term "cold end" refers to a location axially forward or upstream of the combustor 30. While illustrated as housed with the cold end of turbine core 38 of the engine 10, other locations of the electric machine 52 within or adjacent the turbine core 38 are contemplated. The electric machine 52 can be one or more of a starter, a starter generator, a generator, or motor. The electric machine 52 can include one or more devices that use electromagnetic forces. It is contemplated that the electric machine 52 includes at least one drive shaft. It is further contemplated that the electric machine 52 can include any number of gears, shafts, transformers, magnetics, brushes, induction devices, or other electrical or mechanical elements.

The LP turbine spool, LP turbine shaft, or low speed shaft 56 is disposed coaxially about the turbine engine axis of rotation 12 of the turbine engine 10 within the larger diameter annular high speed shaft 48. The low speed shaft 56 connects the LP turbine 36 to the input/output 49 of the electric machine 52. The connection between the low speed shaft 56 and the electric machine 52 is permanent, including rotatably permanent. That is, when a portion of the electric machine 52 is rotating, then the low speed shaft 56 rotates and when the low speed shaft 56 rotates, then at least a portion of the electric machine 52 rotates. The low speed shaft 56 does not disengage from the electric machine 52; the connection is permanent. Therefore, the electric machine 52 can drive the low speed shaft 56 by providing a rotatable output to the low speed shaft 56 via the input/output 49. Alternatively, or additionally, the electric machine 52 can receive an input via the input/output 49 from the low speed shaft 56 for the generation of electrical energy. As described above, the permanent connection between the low speed shaft 56 and the input/output 49 of the electric machine 52 can be made via the second gearbox 57.

As illustrated, by way of example, the low speed shaft 56 extends below the electric machine 52 and couples to a forward side of the electric machine 52. It is contemplated that the low speed shaft 56 can couple to the electric machine 52 at any point, including a bottom portion, top portion, or aft side of the electric machine 52. It is further contemplated that the electrical machine 52 can be located in-line with the low speed shaft 56 or the high speed shaft 48.

The first clutch assembly 50 selectively couples the high speed shaft 48 to the output 53 of the electric machine 52. That is, the electric machine 52 selectively operably couples to the high speed shaft 48 via the first clutch assembly 50 to selectively provide an output to the high speed shaft 48.

Optionally, a bevel gearbox or the first gearbox 54 can be provided between or included in the electric machine 52 that rotatably couples at least a portion of the first clutch assembly 50 to the output 53 of the electric machine 52. The first clutch assembly 50 can be an over-running clutch that is in direct rotational communication with the electric machine 52 to selectively provide an output to the high speed shaft 48. Alternatively, the first clutch assembly 50 can include any type or combination of clutch mechanisms, such as, but not limited to one or more of a sprag, spring, a roller or ball, a ratchet and pawl clutch, or other known clutches.

The LP compressor 24 and fan assembly 20 can be coupled to a supplemental shaft 58. The electric machine assembly 51 can further include a second clutch assembly 60 that selectively couples the supplemental shaft 58 to the electric machine 52 or the low speed shaft 56.

As illustrated, by way of example, the second clutch assembly 60 selectively couples the supplemental shaft 58 to a second output or supplemental coupling 61 of the electric machine 52 via the second gearbox 57. Alternatively, the supplemental shaft 58, via the second clutch assembly 60, can directly couple to the supplemental coupling 61 of the electric machine 52 or the low speed shaft 56.

It is contemplated that the engagement of the second clutch assembly 60 can allow the electric machine 52, via a supplemental coupling 61, or the low speed shaft 56 to rotate the supplemental shaft 58. It is further contemplated that the engagement of the second clutch assembly 60 can allow the supplemental shaft 58 to rotate the electrical machine 52 at the supplemental coupling 61 or rotate the low speed shaft 56.

That is, the low speed shaft 56, the second gearbox 57, or the electric machine 52 selectively operably couples to the supplemental shaft 58 via the second clutch assembly 60 to selectively receive an input or provide an output to the supplemental shaft 58. The rotation of the supplemental shaft 58 can be input into the electric machine 52 for the generation of electrical energy. The electrical energy from the electric machine 52 can be communicated to one or more accessories 62. The one or more accessories can include one or more of a battery bank, lighting, pump, instrument, radio, flap, landing gear, or other systems or operative structures of the vehicle.

The second clutch assembly 60 can be a sprag clutch. Alternatively, the second clutch assembly 60 can include any type or combination of clutch mechanisms or coupling mechanisms, such as, but not limited to one or more of a spring, a roller or ball, a ratchet and pawl clutch, or other known over-running clutches.

While illustrated in a specific configuration in FIG. 1, it is contemplated that the electric machine 52, the first clutch assembly 50, and the second clutch assembly 60 can be orientated or located in alternate positions and maintain the same connectivity and function relative to the low speed shaft 56, the high speed shaft 48, and the supplemental shaft 58.

The high speed shaft 48, the low speed shaft 56, and the supplemental shaft 58 are rotatable about the engine centerline and couple to a plurality of rotatable elements, which can collectively define an inner rotor/stator. While illustrated as a rotor, it is contemplated that the inner rotor/stator can be a stator.

The LP compressor 24 and the HP compressor 26 respectively include a plurality of compressor stages 64, 68, in which a set of compressor blades 70, 72 rotate relative to a corresponding set of static compressor vanes 74, 76, which can also be called a nozzle, to compress or pressurize the stream of fluid passing through the stage. In a single compressor stage 64, 68, multiple compressor blades 70, 72 can be provided in a ring and can extend radially outwardly relative to the turbine engine axis of rotation 12, from a blade platform to a blade tip, while the corresponding static compressor vanes 74, 76 are positioned upstream of and adjacent to the rotating compressor blades 70, 72. It is noted that the number of blades, vanes, and compressor stages shown in FIG. 1 was selected for illustrative purposes only, and that other numbers are possible.

The LP compressor blades 70 for a stage of the compressor can be mounted to the supplemental shaft 58. The HP compressor blades 72 can be mounted to the high speed shaft 48. The vanes 74, 76 for a stage of the compressor can be mounted to the core housing 46 in a circumferential arrangement.

The HP turbine 34 and the LP turbine 36 respectively include a plurality of turbine stages 78, 80, in which a set of turbine blades 82, 84 is rotated relative to a corresponding set of static turbine vanes 86, 88, which can also be called a nozzle, to extract energy from the stream of fluid passing through the stage. In a single turbine stage 78, 80, multiple turbine blades 82, 84 can be provided in a ring and can extend radially outwardly relative to the turbine engine axis of rotation 12, from a blade platform to a blade tip, while the corresponding static turbine vanes 86, 88 are positioned upstream of and adjacent to the rotating blades 82, 84. It is noted that the number of blades, vanes, and turbine stages shown in FIG. 1 was selected for illustrative purposes only, and that other numbers are possible.

The HP turbine blades 82 for a stage of the turbine can be mounted to the high speed shaft 48. The LP turbine blades 84 for a stage of the turbine can be mounted to the low speed shaft 56 that is rotatably fixed to the electric machine 52. The vanes 86, 88 for a stage of the compressor can be mounted to the core housing 46 in a circumferential arrangement.

Complementary to the rotor portion, the stationary portions of the turbine engine 10, such as the static vanes 74, 76, 86, 88 among the compressor section 22 and turbine section 32 are also referred to individually or collectively as an outer rotor/stator. As illustrated, the outer rotor/stator can refer to the combination of non-rotating elements throughout the turbine engine 10. Alternatively, the outer rotor/stator that circumscribes at least a portion of the inner rotor/stator, can be designed to rotate. The inner or outer rotor/stator can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

In operation, in a first mode or starting mode, the electric machine 52 functions primarily as a starter. Energy is supplied to the electric machine 52. Energy can be supplied to the electric machine 52, for example, from a battery bank, a mechanical starter, or electrical generating device. It is contemplated that the energy supplied to the electric machine 52 is from the one or more accessories 62. The energy supplied to the electric machine 52 rotates one or more components of the electric machine 52 resulting in a rotational of the output 53. The first clutch assembly 50 selectively couples the output 53 of the electric machine 52 to the high speed shaft 48, which rotates the high speed shaft 48. The rotation of the high speed shaft 48 rotates the blades 72, 82 of the HP compressor 26 and HP turbine 34.

As the electric machine 52 provides a rotational output at the output 53 to the high speed shaft 48, the low speed shaft 56 that is permanently coupled to the input/output 49 of the electric machine 52 is also supplied a rotation output. The rotation of the low speed shaft 56 results in the rotation of the blades 84 of the LP turbine 36.

As the rotational velocity of the high speed shaft 48 increases, the supplemental shaft 58 is selectively coupled to the supplemental coupling 61 of the electric machine 52 or the low speed shaft 56 via the second clutch assembly 60. The second clutch assembly 60 can selectively engage based on, for example, axial thermal expansion of one or more components of the electric machine 52, the low speed shaft 56, or other rotating component adjacent to the second clutch assembly 60. By way of non-limiting example, the second clutch assembly 60 additionally or alternatively can be activated or engage based on the load carried by one or more bearings, one or more speed or thermal sensors, counter-rotation, input provided by an active automatic control, a pilot or user, or reaching a predetermined torque value. The second clutch assembly 60 can engage before or after the electric machine 52 switches from the first mode to a second mode.

Once coupled via the second clutch assembly 60, the supplemental shaft 58 can receive a rotational output from the supplemental coupling 61 of the electric machine 52 via the second gearbox 57 or the low speed shaft 56. Alternatively, the supplemental shaft 58 can provide a rotational input at the supplemental coupling 61 to the electric machine 52 for generation of electrical power. Electric power from the electric machine 52 can be provided to the one or more accessories 62.

In a second mode or generating mode, the electric machine 52 functions primarily as a generator, providing electrical energy to the one or more accessories 62. The transition from the first mode to the second mode occurs when the first clutch assembly 50 disengages the output 53 of the electric machine 52 from the high speed shaft 48. The first clutch assembly 50 is adapted to disengage the electric machine 52 from the high speed shaft 48 when a predetermined torque or speed of the high speed shaft 48 is reached. The predetermined torque or speed can depend on the idle speed of the turbine engine 10. As used herein, "idle speed" is the speed at which the engine core 44 has to spin in order for the turbine engine 10 to idle or self-sustain. It is contemplated that the predetermined torque or speed can be greater than or equal to the idle speed of the turbine engine 10. However, it is contemplated that the predetermined torque or speed can be less than the idle speed of the turbine engine 10.

Once the engine is self-sustaining, the airflow exiting the fan section 18 is split such that a portion of the airflow is channeled into the LP compressor 24, which then supplies pressurized airflow 90 to the HP compressor 26, which further pressurizes the air.

The pressurized airflow 90 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the electric machine 52, and the exhaust gas is ultimately discharged from the turbine engine 10 via the nozzle section 37. The driving of the LP turbine 36 can also drive the supplemental shaft 58 to rotate the fan assembly 20 and the LP compressor 24 via the electric machine 52 or the second clutch assembly 60.

The electric machine 52 can generate electricity in the second mode as a result of the rotation of the LP turbine 36 due to the exhaust of gases from the combustor 30. The rotation of the LP turbine 36 results in the rotation of the low speed shaft 56. The low speed shaft 56 can provide a rotatable input to the input/output 49 of the electric machine 52 for generating electrical energy. Alternatively, the low speed shaft 56 rotates a portion of the second gearbox 57, which provides an input to the input/output 49 of the electric machine 52. Electric power from the electric machine 52 is used to power the one or more accessories 62.

A portion of the pressurized airflow 90 can be drawn from the compressor section 22 as bleed air 92. The bleed air 92 can be drawn from the pressurized airflow 90 and provided to engine components requiring cooling. The temperature of pressurized airflow 90 entering the combustor 30 is significantly increased. As such, cooling provided by the bleed air 92 is necessary for operating of such engine components in the heightened temperature environments.

A remaining portion of the airflow 94 bypasses the LP compressor 24 and the engine core 44 and exits the turbine engine 10 through a stationary vane row, and more particularly an outlet guide vane assembly 96, comprising a plurality of airfoil guide vanes 98, at the fan exhaust side 100. More specifically, a circumferential row of radially extending airfoil guide vanes 98 are utilized adjacent the fan section 18 to exert some directional control of the airflow 94.

Some of the air supplied by the fan assembly 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion, as it is directly downstream of the combustion section 28. Other sources of cooling fluid can be, but are not limited to, fluid discharged from the LP compressor 24 or the HP compressor 26.

Figure 2:
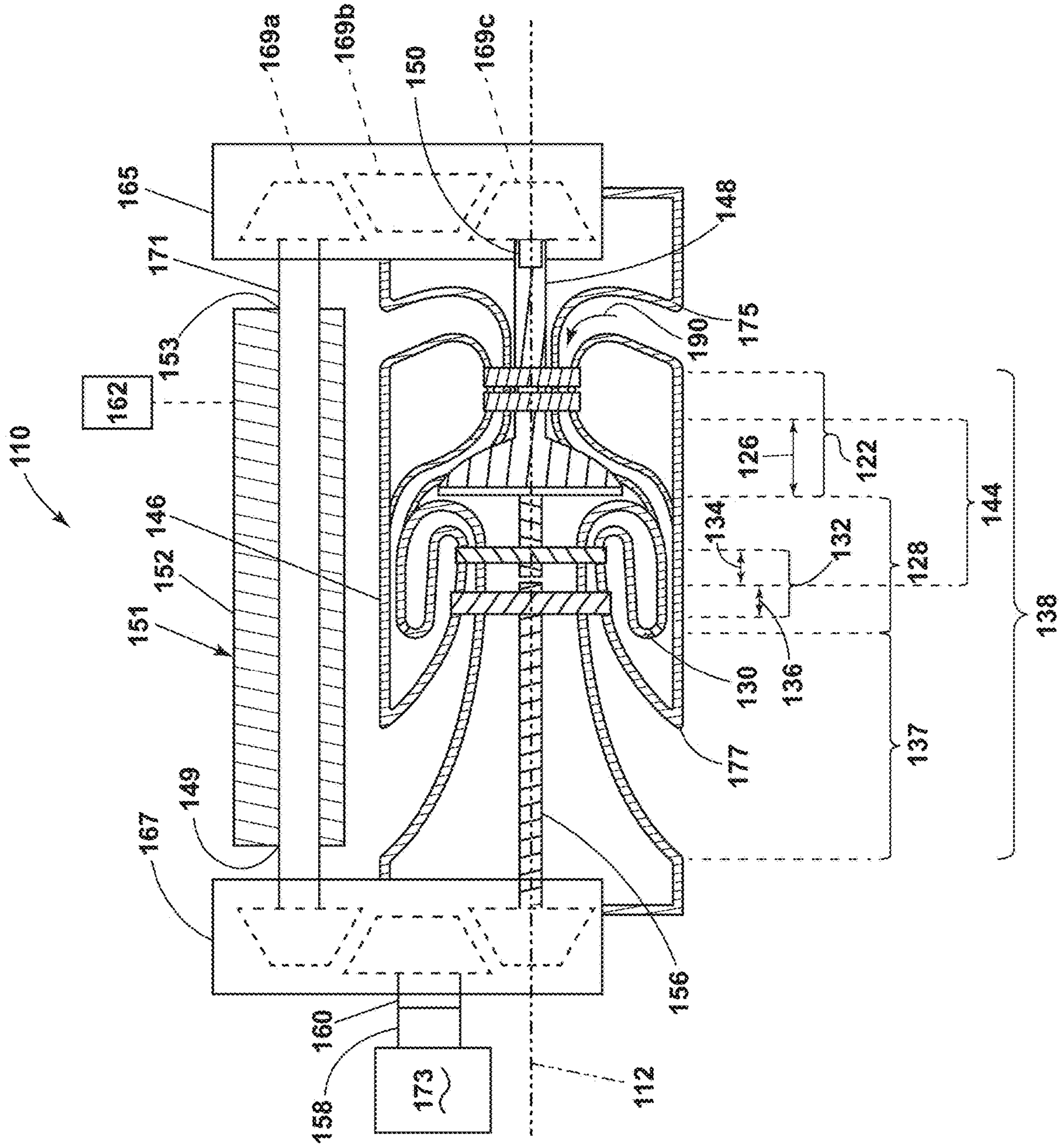
FIG. 2 is a variation of the schematic view of a portion of the turbine engine of FIG. 1 having an electric machine assembly, according to aspects of the present disclosure.

FIG. 2 is another example of a schematic view of a portion of a gas turbine engine 110 for an aircraft. The portion of the turbine engine 110 is similar to portions of the turbine engine 10, therefore, like parts will be identified with like numerals increased by 100, with it being understood that the description of the like parts of the turbine engine 10 applies to the turbine engine 110 unless otherwise noted.

The turbine engine 110 has a centerline or turbine engine axis of rotation. The turbine engine 110 includes, a compressor section 122 including a compressor 126, a combustion section 128 including a combustor 130, a turbine section 132 including a HP turbine 134, and a Free Power Turbine or LP turbine 136, and a nozzle section 137 that are axially aligned. A turbine core 138 can be defined by the compressor section 122, the combustion section 128, the turbine section 132, and the nozzle section 137. The compressor 126, the combustor 130, and the HP turbine 134 can form an engine core 144, which generates combustion gases. The turbine core 138 which includes the engine core 144 can be surrounded by core housing 146.

The HP spool, HP shaft, or high speed shaft 148 is disposed coaxially about the turbine engine axis of rotation 112 of the turbine engine 110 and drivingly connects the HP turbine 134 to the compressor 126. The high speed shaft 148 can be considered part of the turbine engine 110.

The LP turbine spool, LP turbine shaft, or low speed shaft 156 is disposed coaxially about a turbine engine axis of rotation 112 of the turbine engine 110. The low speed shaft 156 permanently connects the LP turbine 136 to an electrical power system or electric machine assembly 151. While the low speed shaft 156 permanently provides a rotational input/output to the electric machine assembly 151 it can be considered part of the turbine engine 110.

In the illustrated example, the electric machine assembly 151 includes an electric machine 152 having an input/output 149 permanently coupled to the low speed shaft 156 and an output 153 selectively coupled to the high speed shaft 148 via a first clutch assembly 150. Optionally, the electric machine assembly 151 can further include a first gearbox 165 and a second gearbox 167. The first gearbox 165 can couple the output 153 of the electric machine 152 to the first clutch assembly 150, where the first clutch assembly 150 selectively engages the high speed shaft 148. One or more portions of the second gearbox 167 can be part of the permanent connection between the input/output 149 of the electric machine 152 and the low speed shaft 156.

The electric machine 52 is shown, by way of example, as extending axially or generally parallel to the turbine core 138 of the turbine engine 110, wherein the term, "generally parallel" means+/−20 degrees of being at an angle of zero or parallel. The input/output 149 and the output 153 of the electric machine 152 can couple to the first gearbox 165 and the second gearbox 167, respectively. The connection between the electric machine 152 and the first gearbox 165 or second gearbox 167 can be via at least one shaft 171. The first gearbox 165 can be located adjacent the compressor section 122, while the second gearbox 167 can be located adjacent the nozzle section 137. The size to the electric machine 152 can vary and the at least one shaft 171 can be any number of shafts that couple the electric machine 152 to the first gearbox 165 and the second gearbox 167.

Further, the electric machine 152 is illustrated as adjacent the engine core 144 and radially outside of the core housing 146. It is contemplated the electric machine 152 can be located within the core housing 146 or at a location that is forward or aft of the turbine core 138 or the engine core 144.

The low speed shaft 156 permanently couples the LP turbine 136 to the input/output 149 of the electric machine 152. The connection between the low speed shaft 156 and the electric machine 152 is rotatably permanent. That is, when a portion of the electric machine 152 is rotating, the low speed shaft 156 rotates, and when the low speed shaft 156 rotates, at least a portion of the electric machine 152 rotates. The low speed shaft 156 does not disengage from the electric machine 152; the connection is permanent. Therefore, the electric machine 152 can drive the low speed shaft 156 by providing a rotatable output to the low speed shaft 156 via the input/output 149. Alternatively, or additionally, the electric machine 152 can receive an input, for example rotational kinetic energy, from the low speed shaft 156 for the generation of electrical energy via the input/output 149. Optionally, the permanent connection between the low speed shaft 156 and the electric machine 152 can be made via a bevel gearbox or the second gearbox 167. While illustrated as being similar to the first gearbox 165, it is contemplated that the second gearbox 167 can include a different number of gears, a different gearing system, or otherwise rotatably couple the input/output 149 of the electric machine 152 to the low speed shaft 156 using any known methods.

The first clutch assembly 150 selectively couples the high speed shaft 148 to the output 153 of the electric machine 152. That is, the electric machine 152 selectively operably couples to the high speed shaft 148 via the first clutch assembly 150 to selectively provide an output to the high speed shaft 148.

Optionally, the first gearbox 165 selectively operably couples the high speed shaft 148 to the output 153 of the electric machine 152 and can include or be adjacent to the first clutch assembly 150. The first gearbox 165 can include, by way of non-limiting example, three gears 169*a*, 169*b*, 169*c*. While illustrated as bevel gears, any known type of gearing or number of gears can be used in the first gearbox 165 to rotatably couple the electric machine 152 to the first clutch assembly 150 or the high speed shaft 148. Alternatively, the first clutch assembly 150 can be in direct rotational communication with the output 153 of the electric machine 152 to selectively provide an output to the high speed shaft 148.

As illustrated, by way of example, a second clutch assembly 160 can selectively couple a supplemental shaft 158 to the second gearbox 167. The coupling of the supplemental shaft 158 to the second gearbox 167 can be an example of a second outlet of the electric machine assembly 151. When engaged, the second clutch assembly 160 can receive a rotational input from the second gearbox 167, which is translated to the supplemental shaft 158. Alternatively, the supplemental shaft 158, via the second clutch assembly 160, can directly selectively couple to the low speed shaft 156 or the electric machine 152.

The supplemental shaft 158 can be coupled to a load 173. The load 173 can be, for example, the drive train of a helicopter, or other gearing that provides rotation to one or more propellers. Additionally, or alternatively, it is contemplated the load 173 can be a high bypass engine fan or a shaft, such as a booster shaft.

The second clutch assembly 160 selectively couples the load 173 to the electric machine 152 or the low speed shaft 156. That is, the low speed shaft 156 via the second gearbox 167 and the second clutch assembly 160 can provide an output to the load 173. Alternatively, the input/output 149 or other supplemental connection of the electric machine 152 via the second gearbox 167 and the second clutch assembly 160 can provide an output to the load 173. That is, the low speed shaft 156 or electric machine 152 selectively operably couple to the supplemental shaft 158 via the second clutch assembly 160 to selectively provide an output to the supplemental shaft 158.

In operation, in a first mode, the electric machine 152 functions primarily as a starter. Energy can be supplied to the electric machine 152, for example, from a battery bank, a mechanical starter, or electrical generating device. The energy supplied to the electric machine 152 rotates one or more components of the electric machine 152 resulting in a rotational of the output 153.

The first clutch assembly 150 selectively couples the output 153 of the electric machine 152 to the high speed shaft 148, which rotates the high speed shaft 148. The high speed shaft 148 rotates portions of the compressor 126 and HP turbine 134. As the electric machine 152 provides a rotational output to the high speed shaft 148 via the output 153, the low speed shaft 156 that is coupled to the input/output 149 of the electric machine 152 also rotates. The rotation of the low speed shaft 156 results in the rotation of portions of the LP turbine 136.

In a second mode, the electric machine 152 functions primarily as a generator, providing electrical energy to the one or more accessories 162. The transition or change from the first mode to the second mode occurs with the disengagement of the high speed shaft 148 from the output 153 of the electric machine 152 via the first clutch assembly 150. The first clutch assembly 150 disengages the electric machine 152 from the high speed shaft 148 at predetermined torque or speed of the high speed shaft 148. The predetermined torque or speed can depend on the idle speed of the turbine engine 110. It is contemplated that the predetermined torque or speed can be greater than or equal to the idle speed of the turbine engine 110. However, it is contemplated that the predetermined torque or speed can be less than the idle speed of the turbine engine 110.

The second clutch assembly 160 can engage before or after the electric machine 152 switches from the first mode to a second mode. As the rotational velocity of the high speed shaft 148 increases, the supplemental shaft 158 is selectively coupled to the electric machine 152, the second gearbox 167, or the low speed shaft 156 via the second clutch assembly 160. The second clutch assembly 160 can selectively engage based on, for example, axial thermal expansion of one or more components of the electric machine 152, the low speed shaft 156, the second gearbox 167, or another component adjacent to the second clutch assembly 160. By way of non-limiting example, the second clutch assembly 160 additionally or alternatively can be activated or engage based on the load carried by one or more bearings, one or more speed or thermal sensors, counter-rotation, input provided by an active automated control, a pilot or user, or reaching a predetermined torque value.

Once coupled via the second clutch assembly 160, the supplemental shaft 158 can receive a rotational output from the electric machine 152, the low speed shaft 156, or the second gearbox 167. The rotational output provided to the supplemental shaft 158 can be transferred to an outside load 173. That is, the supplemental shaft 158 can provide a driving force to the load 173. The load 173, by way of example, can be a drive train, a gearbox, a propeller, a high bypass engine fan, or a shaft. Additionally, or alternatively, it is contemplated that additional gearing or clutch assemblies can be located within, coupled to, or adjacent the load 173 to selectively couple the load 173 to the supplemental shaft 158.

During at least a portion of the first mode and during the second mode when the turbine engine is self-sustaining, air flows into an inlet 175 which is channeled into the compressor section 122. Pressurized airflow 190 from the compressor 126 is mixed with fuel in the combustor 130 and ignited, thereby generating combustion gases. Some work is extracted from these gases by the HP turbine 134, which drives the compressor 126. The combustion gases are discharged into the LP turbine 136, which extracts additional work to drive the electric machine 152, and the exhaust gas is ultimately discharged from the turbine engine 110 via an outlet 177 in the nozzle section 137.

The electric machine 152 can generate electricity in the second mode as a result of the rotation of the LP turbine 136 due to the exhaust of gases from the combustor 130. The rotation of the LP turbine 136 results in the rotation of the low speed shaft 156. The low speed shaft 156 can provide a rotational input to the second gearbox 167, where the second gearbox 167 can provide a rotational input at the input/output 149 of the electric machine 152.

While not illustrated, it is contemplated that a portion of the pressurized airflow 190 can be drawn from the compressor section 122 as bleed air to provide to engine components with cool air.

Figure 3:
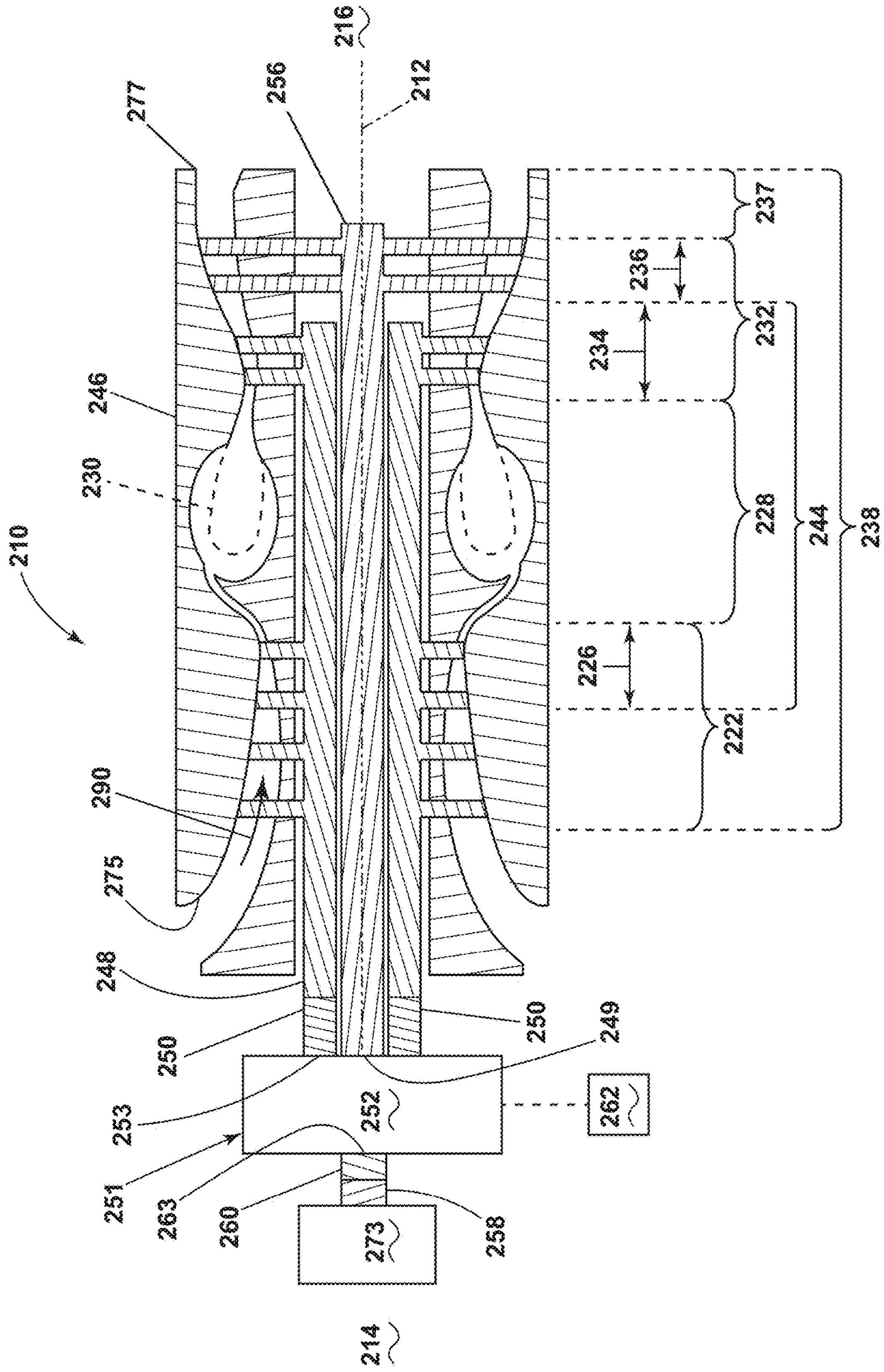
FIG. 3 is another variation of the schematic view of a portion of the turbine engine of FIG. 1 having an electric machine assembly, according to aspects of the present disclosure.

FIG. 3 is yet another schematic view of a portion of a gas turbine engine 210 for an aircraft. The portion of the turbine engine 210 is similar to portions of the turbine engine 10 and the turbine engine 110 therefore, like parts will be identified with like numerals further increased by 100, with it being understood that the description of the like parts of the turbine engine 10 and the turbine engine 110 applies to the turbine engine 210 unless otherwise noted.

The turbine engine 210 has a centerline or turbine engine axis of rotation 212 extending forward 214 to aft 216. The turbine engine 210 includes, in downstream serial flow relationship, a compressor section 222 including a compressor 226, a combustion section 228 including a combustor 230, a turbine section 232 including a HP turbine 234, and a LP turbine 236, and a nozzle section 237. A turbine core 238 can be defined by the compressor section 222, the combustion section 228, the turbine section 232, and the nozzle section 237.

The compressor 226, the combustor 230, and the HP turbine 234 form an engine core 244, which generates combustion gases. The turbine core 238, which includes the engine core 244, can be surrounded by core housing 246.

The HP spool, HP shaft, or high speed shaft 248 is disposed coaxially about the turbine engine axis of rotation 212 of the turbine engine 210 and drivingly connects the HP turbine 234 to the compressor 226. The high speed shaft 248 can be considered part of the turbine engine 210.

The LP turbine spool, LP turbine shaft, or low speed shaft 256 is disposed coaxially about the turbine engine axis of rotation 212 of the turbine engine 210 within the larger diameter annular high speed shaft 248. As illustrated, the high speed shaft 248 circumscribes at least a portion of the low speed shaft 256. That is, the low speed shaft 256 and the high speed shaft 248 are at least partially co-axial.

The low speed shaft 256 permanently connects the LP turbine 236 to an electrical power system or electric machine assembly 251. While the low speed shaft 256 permanently provides a rotational input/output to the electric machine assembly 251 it can be considered part of the turbine engine 210.

In the illustrated example, the electric machine assembly 251 includes an electric machine 252 having an input/output 249 permanently coupled to the low speed shaft 256 and an output 253 selectively coupled to the high speed shaft 248 via a first clutch assembly 250. The connection between the low speed shaft 256 and the input/output 249 of the electric machine 252 is rotatably permanent. That is, when the input/output 249 of the electric machine 252 is rotating, the low speed shaft 256 rotates, and when the low speed shaft 256 rotates, the input/output of the electric machine 252 rotates. The low speed shaft 256 does not disengage from the electric machine 252; the connection is permanent. Therefore, the electric machine 252 can drive the low speed shaft 256 via the input/output 249 by providing a rotatable output to the low speed shaft 256. Alternatively, or additionally, the electric machine 252 can receive an input from the low speed shaft 256 via the input/output 249 for the generation of electrical energy. Any number of permanent coupling mechanisms can be used to couple the input/output 249 to the low speed shaft 256.

As illustrated, by way of example, the electric machine 252 is located on the cold end of the turbine engine 210, outside of the turbine core 238. Specifically, the electric machine 252 is located forward or upstream of an inlet 275 of air to the compressor section 222. The electric machine 252 can be coaxial about the turbine engine axis of rotation 212 and in line or axially aligned with the high speed shaft 248 or the low speed shaft 256. However, any configuration in which the electric machine 252 engages the concentric high speed and low speeds shafts 248, 256, wherein the connection between the input/output 249 of the electric machine 252 and low speed shaft 256 is permanent, is contemplated.

The first clutch assembly 250 selectively couples the high speed shaft 248 to the output 253 of the electric machine 252. That is, the electric machine 252 selectively operably couples to the high speed shaft 248 via the first clutch assembly 250 to selectively provide an output to the high speed shaft 248.

Optionally, the first clutch assembly 250 can be in direct rotational communication or included in output 253 of the electric machine 252 to selectively provide an output to the high speed shaft 248. Alternatively, one or more gearboxes (not shown) can be mounted between or included in the output 253 of the electric machine 252 that rotatably couple at least a portion of the first clutch assembly 250 to a portion of the electric machine 252.

As illustrated, by way of example, a second clutch assembly 260 can selectively couple a supplemental shaft 258 to a second output or supplemental coupling 263 of the electric machine 252. When engaged, the second clutch assembly 260 can receive a rotational input from the supplemental coupling 263 of the electric machine 252, which is translated to the supplemental shaft 158. Alternatively, one or more gearboxes (not shown) can be mounted between or included in the supplemental coupling 263 of the electric machine 252 that rotatably couple at least a portion of the second clutch assembly 260 to a portion of the electric machine 252.

The supplemental shaft 258 can couple to a load 273. That is, the supplemental shaft 258 can provide a driving force to the load 273. The load 273 can be, for example, a drive train for a helicopter, a propeller, or other gearing that provides rotation to one or more propellers. Additionally, or alternatively, it is contemplated the load 273 can be a high bypass engine fan or a shaft, such as a booster shaft.

The second clutch assembly 260 selectively couples the load 273 to the electric machine 252 via the supplemental coupling 263. That is, the supplemental coupling 263 of the electric machine 252 selectively operably couples to the supplemental shaft 258 via the second clutch assembly 260 to selectively provide an output to the supplemental shaft 258. Alternatively, the second clutch assembly 260 can selectively couple the load 273 to the low speed shaft 256 or the high speed shaft 248.

In operation, in a first mode, the electric machine 252 functions primarily as a starter. Energy can be supplied to the electric machine 252, for example, from a battery bank, a mechanical starter, or electrical generating device. The energy supplied to the electric machine 252 rotates one or more components of the electric machine 252 resulting in a rotation of the output 253.

The first clutch assembly 250 selectively couples the output 253 of the electric machine 252 to the high speed shaft 248, which rotates the high speed shaft 248. The high speed shaft 248 rotates portions of the compressor 226 and HP turbine 234. As the electric machine 252 provides a rotational output to the high speed shaft 248 via the output 253, the low speed shaft 256 that is coupled to the input/output 249 of the electric machine 252 also rotates. The rotation of the low speed shaft 256 results in the rotation of portions of the LP turbine 236.

In a second mode, the electric machine 252 functions primarily as a generator, providing electrical energy to the one or more accessories 262. The transition from the first mode to the second mode occurs when the first clutch assembly 250 disengages the high speed shaft 248 from the output 253 of the electric machine 252. The first clutch assembly 250 disengages the electric machine 252 from the high speed shaft 248 when a predetermined torque or speed of the high speed shaft 248 is reached. The predetermined torque or speed can depend on the idle speed of the turbine engine 210. It is contemplated that the predetermined torque or speed can be greater than or equal to the idle speed of the turbine engine 210. However, it is contemplated that the predetermined torque or speed can be less than the idle speed of the turbine engine 210.

The second clutch assembly 260 can engage before or after the electric machine 252 switches from the first mode to a second mode. As the rotational velocity of the high speed shaft 248 increases, the supplemental shaft 258 is selectively coupled to the supplemental coupling 263 of the electric machine 252 via the second clutch assembly 260. The second clutch assembly 260 can selectively engage based on, for example, axial thermal expansion of one or more components of the electric machine 252, the low speed shaft 256, or another component adjacent to the second clutch assembly 260. By way of non-limiting example, the second clutch assembly 260 additionally or alternatively can be activated or engage based on the load carried by one or more bearings, one or more speed or thermal sensors, counter-rotation, input provided by an active automated control, a pilot or user, or reaching a predetermined torque value.

Once coupled via the second clutch assembly 260, the supplemental shaft 258 can receive a rotational output from the supplemental coupling 263 of the electric machine 252 or the low speed shaft 256. The rotational output provided to the supplemental shaft 258 can be transferred to the load 273. The load 273, by way of example, can be a helicopter drive train or aircraft propeller. Additionally, or alternatively, it is contemplated that additional gearing or clutch assemblies can be located within, coupled to, or adjacent the load 273 to selectively couple the load 273 to the supplemental shaft 258.

During a portion of the start-up and once the engine is self-sustaining, air flows into an inlet 275 which is channeled into the compressor section 222. Pressurized airflow 290 from the compressor 226 is mixed with fuel in the combustor 230 and ignited, thereby generating combustion gases. Some work is extracted from these gases by the HP turbine 234, which drives the compressor 226. The combustion gases are discharged into the LP turbine 236, which extracts additional work to drive the electric machine 252, and the exhaust gas is ultimately discharged from the turbine engine 210 via an outlet 277 in the nozzle section 237.

The electric machine 252 can generate electricity in the second mode as a result of the rotation of the LP turbine 236 due to the exhaust of gases from the combustor 230. The rotation of the LP turbine 236 results in the rotation of the low speed shaft 256. The low speed shaft 256 can provide a rotational input to the input/output 249 of the electric machine 252.

While not illustrated, it is contemplated that a portion of the pressurized airflow 290 can be drawn from the compressor section 222 as bleed air to provide to engine components with cool air.

Figure 4:
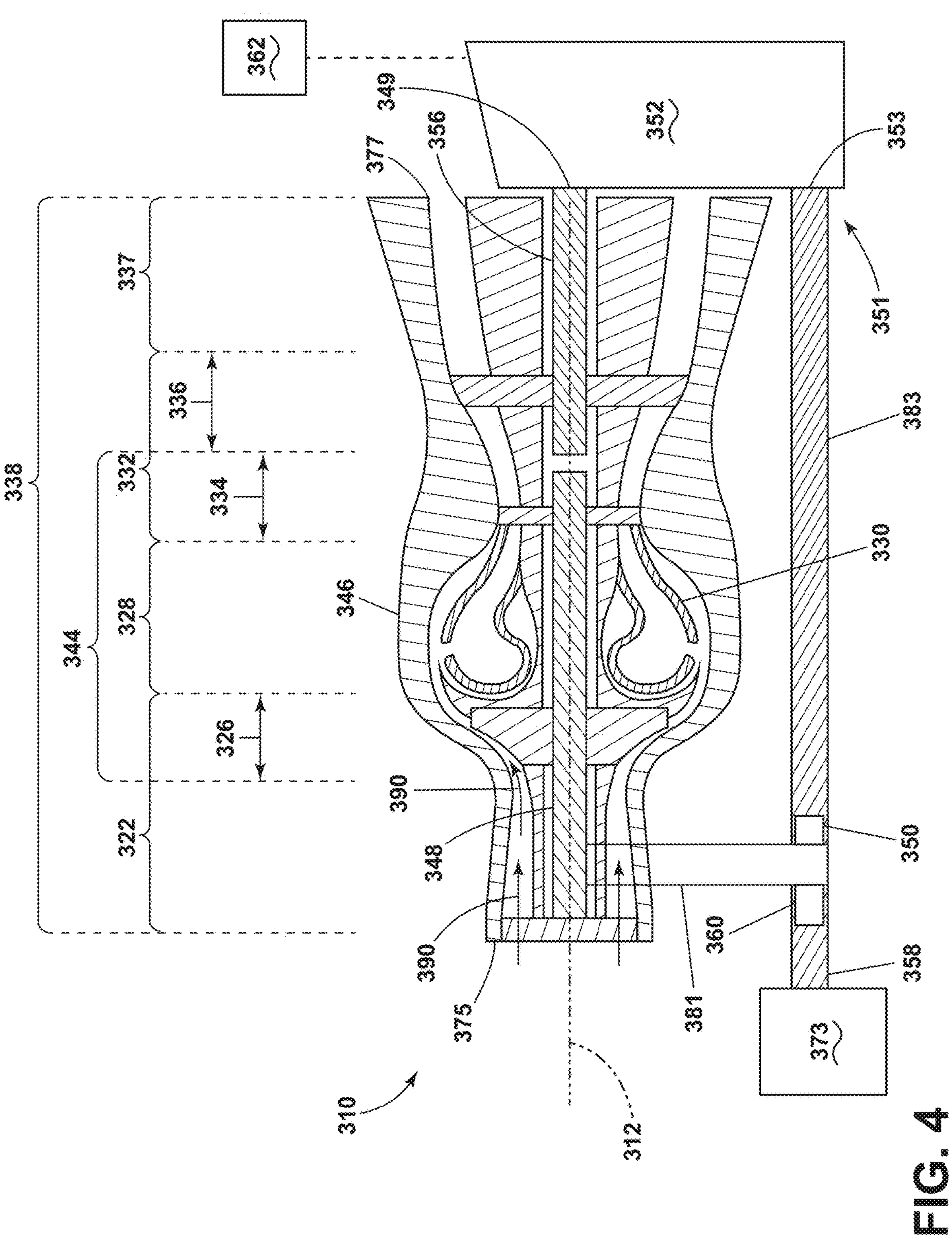
FIG. 4 is yet another variation of the schematic view of a portion of the turbine engine of FIG. 1 having an electric machine assembly, according to aspects of the present disclosure.

FIG. 4 is still yet another example of a schematic view of a portion of a gas turbine engine 310 for an aircraft. The portion of the turbine engine 310 is similar to portions of the turbine engines 10, 110, and 210 therefore, like parts will be identified with like numerals further increased by 100, with it being understood that the description of the like parts of the turbine engines 10, 110, and 210 applies to the turbine engine 310 unless otherwise noted.

The turbine engine 310 has a centerline or turbine engine axis of rotation 312. The turbine engine 310 includes, a compressor section 322 including a compressor 326, a combustion section 328 including a combustor 330, a turbine section 332 including a HP turbine 334, and a LP turbine 336, and a nozzle section 337 in a serial axial arrangement. A turbine core 338 can be defined by the compressor section 322, the combustion section 328, the turbine section 332, and the nozzle section 337. The compressor 326, the combustor 330, and the HP turbine 334 form an engine core 344, which generates combustion gases. The turbine core 338, which includes the engine core 344, can be surrounded by core housing 346.

The HP spool, HP shaft, or high speed shaft 348 is disposed coaxially about the turbine engine axis of rotation 312 of the turbine engine 310 and drivingly connects the HP turbine 334 to the compressor 326. The high speed shaft 348 can be considered part of the turbine engine 310.

The LP turbine spool, LP turbine shaft, or low speed shaft 356 is disposed coaxially about the turbine engine axis of rotation 312 of the turbine engine 310. The low speed shaft 356 permanently connects the LP turbine 336 to an electrical power system or electric machine assembly 351. While the low speed shaft 356 permanently provides a rotational input/output to the electric machine assembly 351 it can be considered part of the turbine engine 310.

In the illustrated example, the electric machine assembly 351 includes an electric machine 352 having an input/output 349 permanently coupled to the low speed shaft 356 and an output 353 selectively coupled to the high speed shaft 348 via a first clutch assembly 350. Optionally, the electric machine assembly 351 can further include a gearbox 381 or an extension shaft 383. The gearbox 381 can couple the first clutch assembly 350 to the high speed shaft 348. The extension shaft 383 can couple the output 353 of the electric machine 352 to the first clutch assembly 350.

As illustrated, by example, the first clutch assembly 350 selectively couples the high speed shaft 348 to the output 353 of the electric machine 352 via the gearbox 381 and the extension shaft 383. That is, the output 353 of the electric machine 352 selectively operably couples to the high speed shaft 348 via the first clutch assembly 350 to selectively provide an output to the high speed shaft 348. Optionally, the first clutch assembly 350 can be adjacent to or included in the gearbox 381 or the output 353 of the electric machine 352.

The gearbox 381 can include any known type of gearing or number of gears, shafts, or other mechanisms used to rotatably connect an extension shaft 383 extending from the output 353 of the electric machine 352 to the high speed shaft 348 when the first clutch assembly 350 is engaged. The extension shaft 383 can be any length or comprise additional rotatable or non-rotatable components.

As illustrated, by way of example, the electric machine 352 is located at the hot end of the turbine engine 310, outside of the turbine core 338. As used herein, the term "hot end" is a location that is axially downstream of the engine core 344. The electric machine 352 can be located down stream of at least a portion of the nozzle section 337. It is contemplated, however, that the electric machine 352 can be located within the core housing 346 or at a location that is forward or aft of the engine core 344 or the turbine core 338.

The connection between the low speed shaft 356 and the electric machine 352 is permanent or rotatably permanent. That is, when the input/output 349 of the electric machine 352 is rotating, the low speed shaft 356 rotates and when the low speed shaft 356 rotates, the input/output 349 of the electric machine 352 rotates. The low speed shaft 356 does not disengage from the electric machine 352; the connection is permanent. Therefore, the electric machine 352 can drive the low speed shaft 356 by providing a rotatable output at the input/output 349 to the low speed shaft 356. Alternatively, or additionally, the electric machine 352 can receive an input, for example rotational kinetic energy, at the input/output 349 from the low speed shaft 356 for the generation of electrical energy. Optionally, the permanent connection between the low speed shaft 356 and the electric machine 352 can be made via a gearbox (not shown).

As illustrated, by way of example, a second clutch assembly 360 can selectively couple a supplemental shaft 358 via the gearbox 381. When engaged, the second clutch assembly 360 can receive a rotational input from the gearbox 381, which is communicated to the supplemental shaft 358. Alternatively, the supplemental shaft 358, via the second clutch assembly 360, can selectively couple to the high speed shaft 348, the extension shaft 383, or a supplementary coupling of the electric machine 352. The coupling of the supplemental shaft 358 to the gearbox 381 or other aspect of the electric machine assembly 351 can be an example of a second output of the electric machine 352 or the electric machine assembly 351.

The supplemental shaft 358 can couple to a load 373. The load 373 can be, for example, the drive train of a helicopter, a high bypass engine fan, a shaft, such as a booster shaft, or other gearing that provides rotation to one or more propellers. Alternatively, one or more gearboxes or additional clutch assemblies (not shown) can be mounted between or included in the load 373 to rotatably couple at least a portion of the load 373 to the supplemental shaft 358.

In operation, in a first mode, the electric machine 352 functions primarily as a starter. Energy can be supplied to the electric machine 352, for example, from a battery bank, a mechanical starter, or electrical generating device. The energy supplied to the electric machine 352 rotates one or more components of the electric machine 352 resulting in a rotation of the output 353.

The first clutch assembly 350 selectively couples the output 353 of the electric machine 352 to the high speed shaft 348, which rotates the high speed shaft 348. The high speed shaft 348 rotates portions of the compressor section 322 and HP turbine 334. As the electric machine 352 provides a rotational output to the high speed shaft 348 via the output 353, the low speed shaft 356 that is coupled to the input/output 349 of the electric machine 352 also rotates. The rotation of the low speed shaft 356 results in the rotation of portions of the LP turbine 336.

In a second mode, the electric machine 352 functions primarily as a generator, providing electrical energy to the one or more accessories 362. The transition from the first mode to the second mode occurs when the first clutch assembly 350 disengages the high speed shaft 348 from the output 353 of the electric machine 352. The first clutch assembly 350 disengages the electric machine 352 from the high speed shaft 348 when a predetermined torque or speed of the high speed shaft 348 is reached. The predetermined torque or speed can depend on the idle speed of the turbine engine 310. It is contemplated that the predetermined torque or speed can be greater than or equal to the idle speed of the turbine engine 310. However, it is contemplated that the predetermined torque or speed can be less than the idle speed of the turbine engine 310.

The second clutch assembly 360 can engage after the electric machine 352 switches from the first mode to a second mode. As the rotational velocity of the high speed shaft 348 increases, the supplemental shaft 358 is selectively coupled to the gearbox 381, or the high speed shaft 348, or the electric machine 352 via the second clutch assembly 360. The second clutch assembly 360 can selectively engage based on, for example, axial thermal expansion of one or more components of the electric machine 352, the high speed shaft 348, the gearbox 381, the extension shaft 383, or another component adjacent to the second clutch assembly 360. By way of non-limiting example, the second clutch assembly 360 additionally or alternatively can be activated or engage based on the load carried by one or more bearings, one or more speed or thermal sensors, counter-rotation, input provided by an active automated control, a pilot or user, or reaching a predetermined torque value.

Once coupled via the second clutch assembly 360, the supplemental shaft 358 can receive a rotational output from the gearbox 381, the high speed shaft 348, or the electric machine 352. The rotational output provided to the supplemental shaft 358 can be transferred to the load 373. That is, the supplemental shaft 358 can provide a driving force to the load 373. The load 373, by way of example, can be a drive train, a gearbox, a high bypass engine fan, a shaft, or a propeller. Additionally, or alternatively, it is contemplated that additional gearing or clutch assemblies can be located within, coupled to, or adjacent the load 373 to selectively couple the load 373 to the supplemental shaft 158.

During at least a portion of the first mode and during the second mode when the turbine engine is self-sustaining, air flows into an inlet 375 which is channeled into the compressor section 322. Pressurized airflow 390 from the compressor 326 is mixed with fuel in the combustor 330 and ignited, thereby generating combustion gases. Some work is extracted from these gases by the HP turbine 334, which drives the compressor 326. The combustion gases are discharged into the LP turbine 336, which extracts additional work to drive the electric machine 352, and the exhaust gas is ultimately discharged from the turbine engine 310 via an outlet 377 in the nozzle section 337.

The electric machine 352 can generate electricity in the second mode as a result of the rotation of the LP turbine 336 due to the exhaust of gases from the combustor 330. The rotation of the LP turbine 336 results in the rotation of the low speed shaft 356. The low speed shaft 356 can provide a rotational input to the input/output 349 of the electric machine 352.

While not illustrated, it is contemplated that a portion of the pressurized airflow 390 can be drawn from the compressor section 322 as bleed air to provide to engine components with cool air.

Benefits of aspects of the disclosure are particularly prevalent for turbo-generator gen-sets turbine engines in hybrid applications where the electric machine is in communication with electric motors and battery banks. The electric machine functioning in a starting mode and a generating mode allows for the elimination of two separate electrical systems traditionally required by the turbine engine (one per shaft) and combines the functionalities needed for starting the engine and power generation. Additionally, accessories needed for the gas turbine can receive power as a combined unit. Further, one of the systems that could be combined between the gas turbine engine and the electric machine is the lubrication and heat exchange systems. Another could be the LP shaft speed sensing system, given the permanent connection between the electric machine and the gas turbine LP shaft. Yet another is the vibration sensing system across the generator and LP spool of the gas turbine. This approach to combination and elimination of multiple systems brings a significant cost and weight advantage for turbo-generators in a hybrid system implementation in aerospace applications.

Another benefit of aspects of the disclosure includes running turbine engine accessories electrically instead of mechanically. When the accessories of the turbine engine are run electrically, increased stability, improved aerodynamics, or a reduction of complication can be achieved, as fewer gearboxes, such as the AGB or the TGB, are no longer needed. Additionally, with fewer gearboxes and fewer spinning components, there are fewer natural resonance matches of spinning objects within the turbine engine. Additionally, there is more flexibility in location and placement of accessories which no longer need to be mechanically connected to a gas turbine shaft. This added flexibility allows for better optimization of aircraft nacelle cross sections and reduced drag profile in flying applications.

Further, with the elimination of the drag of accessory loads traditionally powered mechanically from the core, the turbine engine with the disclosed electric machine assembly allows for lowering of idle power; reducing wear on core components.

Another benefit is improved stability through support sharing of the electric machine and the rotating shafts. Further, the rotatably permanent connection between the low speed shaft and the electric machine can provide additional radial or axial stability through shared structural supports between the low speed shaft and the electric machine housing.

Another benefit is that the electric machine can provide a buffer for natural resonance frequency matching of rotating components. Lower idle thrust and power also allows for reduced take-off and landing runway lengths for the aircraft powered by the gas turbine that include or are coupled to the electric machine.

The LP turbine continues to spin when the turbine engine is rapidly shut down. This is a result of the permanent connection between the low speed shaft and the electric machine results. Having the LP turbine continue to spin during a rapid shut-down of the turbine engine allows hot air to be exhausted from the turbine engine which then reduces thermal effects on the turbine engine.

Further aspects of the disclosure are provided by the subject matter of the following clauses:

A gas turbine engine, comprising a turbine core, comprising a compressor section having a compressor coupled to a high speed shaft, a combustion section, a turbine section having a high pressure turbine coupled to the high speed shaft and a low pressure turbine coupled to a low speed shaft, and a nozzle section, an electric machine coupled to the low speed shaft, and a first clutch assembly selectively operably coupling the electric machine to the high speed shaft, wherein, upon coupling, the electrical machine provides an output to the high speed shaft.

The gas turbine engine of any of the preceding clauses, further comprising a second clutch assembly selectively operably coupling the electric machine, the low speed shaft, or the high speed shaft to a supplemental shaft.

The gas turbine engine of any of the preceding clauses wherein the supplemental shaft provides a driving force to an outside load.

The gas turbine engine of any of the preceding clauses wherein the outside load is a drive train and the second clutch assembly is located within the drive train.

The gas turbine engine of any of the preceding clauses wherein the first clutch assembly is an over-running clutch adapted to disengage the high speed shaft when the high speed shaft reaches a predetermined torque or speed.

The gas turbine engine of any of the preceding clauses wherein the disengagement of the high speed shaft changes the electric machine from a first mode to a second mode.

The gas turbine engine of any of the preceding clauses wherein the low speed shaft and the high speed shaft are at least partially co-axial.

The gas turbine engine of any of the preceding clauses wherein the electrical machine is located in-line with the low speed shaft and the high speed shaft.

The gas turbine engine of any of the preceding clauses wherein the low speed shaft is coupled to the electrical machine via a bevel gearbox having the low speed shaft as an input and the electrical machine as a first output.

The gas turbine engine of any of the preceding clauses wherein the bevel gearbox further comprises a second output selectively operably coupled to an outside load.

The gas turbine engine of any of the preceding clauses wherein the second clutch assembly is a sprag clutch that selectively operably couples the second output to the outside load.

The gas turbine engine of any of the preceding clauses wherein the electric machine is located outside of the turbine core.

The gas turbine engine of any of the preceding clauses wherein the electric machine is located at a hot end of the gas turbine engine.

The gas turbine engine of any of the preceding wherein the electrical machine is permanently coupled to the low speed shaft.

The gas turbine engine of any of the preceding wherein the electrical machine is permanently coupled to the low speed shaft and selectively coupled to the high speed shaft.

An electrical power system for an aircraft having at least one turbine engine with a high speed shaft and a low speed shaft, the electrical power system, comprising an electrical machine connected via a permanent coupling mechanism to the low speed shaft and driven by the low speed shaft, the electrical machine selectively operably coupled to the high speed shaft via a first clutch assembly.

The electrical power system of any of the preceding clauses wherein the first clutch assembly is an over-running clutch adapted to disengage from the high speed shaft when the high speed shaft reaches a predetermined torque or speed.

The electrical power system of any of the preceding clauses wherein the disengagement of the high speed shaft changes the electric machine from a first mode to a second mode.

The electrical power system of any of the preceding clauses wherein the electric machine provides electrical energy to one or more accessories.

The electrical power system of any of the preceding clauses wherein the permanent coupling mechanism is a bevel gearbox having the low speed shaft as an input and the electrical machine as a first output.

The electrical power system of any of the preceding clauses, further comprising a second clutch assembly selectively operably coupling the electric machine, the low speed shaft, or the high speed shaft to a supplemental shaft.

The electrical power system of any of the preceding clauses wherein the supplemental shaft provides a driving force to a drive train, a propeller, a high bypass engine fan, or a shaft.

What is claimed is:

1. A gas turbine engine, comprising:

a turbine core comprising:

- a compressor section including a high pressure compressor and a low pressure compressor;
- a combustion section;
- a turbine section including a high pressure turbine and low pressure turbine, where a high speed shaft couples the high pressure turbine to the high pressure compressor;
- a nozzle section;
- a first gearbox selectively coupling an output of an electric machine and the high speed shaft; and
- a second gearbox couples an input/output of the electric machine and a low speed shaft, wherein the low speed shaft is coupled to the low pressure turbine, wherein the first gearbox is located axially upstream of the high pressure compressor and the second gearbox is located axially between the high pressure compressor and the low pressure compressor.

2. The gas turbine engine of claim 1, wherein the turbine core defines a turbine engine axis of rotation and the high speed shaft is disposed coaxially about the turbine engine axis of rotation.

3. The gas turbine engine of claim 2, the low speed shaft is axially spaced from the high speed shaft and disposed coaxially about the turbine engine axis of rotation.

4. The gas turbine engine of claim 1, wherein at least one shaft couples the electric machine to the first gearbox or the electric machine to the second gearbox.

5. The gas turbine engine of claim 1, wherein the turbine core is surrounded by a core housing and the electric machine is located radially outward of the core housing.

6. The gas turbine engine of claim 5, wherein the electric machine includes at least one shaft, wherein the first gearbox is coupled to a first end of the at least one shaft and the second gearbox is coupled to a second end of the at least one shaft.

7. The gas turbine engine of claim 1, wherein the first gearbox can couple the output of the electric machine to a first clutch assembly, wherein the first clutch assembly selectively engages the high speed shaft.

8. The gas turbine engine of claim 1, wherein the low speed shaft permanently couples the low pressure turbine of the turbine section to the input/output of the electric machine.

9. The gas turbine engine of claim 1, wherein the electric machine is electrically coupled to one or more accessories.

10. The gas turbine engine of claim 1, wherein the high speed shaft drivingly connects the high pressure turbine to the high pressure compressor.

11. The gas turbine engine of claim 1, further comprising a second clutch assembly selectively coupling a supplemental shaft to the second gearbox.

12. The gas turbine engine of claim 11, wherein the supplemental shaft is operably coupled to a load.

13. The gas turbine engine of claim 12, wherein the load is a drive train, a gearbox, a propeller, a high bypass engine fan, or a shaft.

14. The gas turbine engine of claim 1, wherein the low speed shaft is coupled to a free power turbine.

15. The gas turbine engine of claim 1, wherein the compressor section, the combustion section, the turbine section, and the nozzle section are axially aligned.

16. The gas turbine engine of claim 1, wherein the first gearbox includes multiple bevel gears.

17. The gas turbine engine of claim 16, wherein the second gearbox includes multiple bevel gears.

18. The gas turbine engine of claim 17, wherein at least one of the multiple bevel gears of the first gearbox rotatably couples to a first clutch assembly that selectively engages the low speed shaft, and at least one of the multiple bevel gears of the second gearbox rotatably couples to a second clutch assembly that selectively engages a supplemental shaft.

19. The gas turbine engine of claim 18, wherein the supplemental shaft is operably coupled to a drive train, a gearbox, a propeller, a high bypass engine fan, or a shaft.

20. The gas turbine engine of claim 1, wherein the electric machine extends axially and is generally parallel to the turbine core.

* * * * *